United States Patent [19]

Hoxmeier

[11] Patent Number: 4,595,749

[45] Date of Patent: Jun. 17, 1986

[54] DIRECT REMOVAL OF NI CATALYSTS

[75] Inventor: Ronald J. Hoxmeier, Houston, Tex.

[73] Assignee: Shell Oil Company, Houston, Tex.

[21] Appl. No.: 673,978

[22] Filed: Nov. 23, 1984

[51] Int. Cl.$^4$ .............................................. C08F 6/00

[52] U.S. Cl. .................................. 528/483; 528/486; 528/490; 528/491

[58] Field of Search ................ 528/483, 486, 490, 491

[56] References Cited

U.S. PATENT DOCUMENTS

| | | | |
|---|---|---|---|
| 2,893,982 | 7/1959 | Campbell | 528/486 |
| 3,023,201 | 2/1962 | Moberly | 528/486 |
| 3,780,138 | 12/1973 | Hassell | 528/486 |
| 4,028,485 | 6/1977 | Poloso et al. | 528/486 |

FOREIGN PATENT DOCUMENTS

| | | | |
|---|---|---|---|
| 430110 | 1/1975 | Fed. Rep. of Germany | 528/486 |
| 1020720 | 2/1966 | United Kingdom . | |

*Primary Examiner*—Joseph L. Schofer
*Assistant Examiner*—J. M. Reddick
*Attorney, Agent, or Firm*—Peter A. Bielinski

[57] ABSTRACT

A method is provided for separating metal catalyst contaminants from organic polymers, typically polymers derived from dienes and/or vinyl arenes, by treatment with a dicarboxylic acid and an oxidant which forms an insoluble metal compound, then separating the insoluble compound to remove the contaminating metal.

16 Claims, No Drawings

DIRECT REMOVAL OF NI CATALYSTS

This invention is concerned with a method for removing metal catalyst contaminants from organic polymers. It is specifically concerned with a one step method in which contaminating metal ions in a polymer are removed and precipitated by treatment with dicarboxylic acids which is then separated to remove dissolved metal ion.

BACKGROUND OF THE INVENTION

This application is related to Ser. No. 673,979, now abandoned, which is being filed concurrently herewith. The hydrogenation of unsaturated polymers is well known in the prior art. Usually a solution of the polymer in an inert solvent is contacted at elevated temperature with hydrogen under pressure in the presence of a heavy metal catalyst which usually comprises at least one transition metal catalyst comprising nickel, cobalt or iron, with or without aluminum or lithium. Specific techniques may be found in British Pat. No. 1,020,720.

Unsaturated polymers are hydrogenated for a variety of reasons. The presence of olefinic double bonds in the polymers makes them susceptible to oxygen attack and to deterioration by actinic radiation; saturation of olefinic double bonds greatly improves environmental stability. Hydrogenation may improve color. Polyethylene has been produced by hydrogenation of elastomeric polybutadiene (Ind. and Eng. Chem. 45, 1117-22 (1953), and Rubber Chem. and Tech. 35, 1052 (1962)). In certain block copolymers or homopolymers resistance to flow under stress when hot is improved by hydrogenating the aromatic rings to alicyclic rings. In other block copolymers made solely from dienes, good thermoplastic elastomers can be produced by hydrogenating all of the olefinic double bonds.

A common problem shared by all of these types of hydrogenated polymers is the deleterious effect of the small amounts of metal catalyst residues remaining after hydrogenation. The quantity of metal to be removed may be as high as 50,000 parts per million. The metal causes polymer deterioration by promoting reactions with air and actinic radiation, and must therefore be removed almost completely, e.g., to less than about 10 p.p.m. although higher limits may be adequate for some purposes. Filtration may be carried out first to remove much of the catalyst, but residual contamination is very difficult to remove by purely physical separation; chemical reaction and then separation are required.

Affter the hydrogenation reaction to saturate the double bonds in the polymer, metal catalyst residues remain and vigorous reaction, sometimes at elevated temperatures and for extended time, is required to dissolve them. Strong acids such as hydrochloric acid and sulfuric acid have been used in the past, but such mixtures are very corrosive and may have a deleterious effect on equipment used and on the hydrogenated polymer from which the metals are being removed.

U.S. Pat. No. 3,780,138 discloses a process which incorporates extraction with dilute citric acid. The method requires large volumes of extractant, relatively long extraction times and phase separation is not sharp. Currently practiced catalyst removal systems use an aqueous acid extraction system with 0.3-1% $H_2SO_4$. The acid stream volumes are of comparable size to the polymer cement streams.

In a typical polymer synthesis, lithium salts of living polymer anion chains are terminated (quenched) with alcohol in the polymerization section at the conclusion of the polymerization reaction. This polymer cement, containing lithium alkoxides, is then moved downstream to the hydrogenation section where it is contacted with $H_2$ and a Ni catalyst. The Ni catalyst is manufactured from Ni carboxylate salts and triethylaluminum. At the completion of the hydrogenation reaction, the polymer cement, containing catalyst, is sent to the catalyst extraction section where the Ni and Al are removed by contacting with, for example, dilute $H_3PO_4$ or dilute $H_2SO_4$. After phase separating the organic and aqueous streams, the polymer cement is forwarded to a finishing section. The aqueous stream can be sent to the effluent plant for metals recovery, for example, by precipitation, and for bio-treating to decompose entrained and dissolved organics. The recovered metal-containing-sludge is usually disposed of, for example, by trucking to a landfill.

It has now been discovered that the direct precipitation of metals from the organic polymer cement phase is possible using an oxidant and dicarboxylic acid. The approach described here combines extraction and precipitation steps using di-carboxylic acids to both extract and precipitate metals directly from polymer cements. After precipitation of the catalyst, the cement could be filtered and sent directly to finishing. There would be no aqueous phase and thus no bio-treating load from the catalyst removal unit. Likewise, the metals removal operation would be done in the catalyst removal section, not in the effluent treatment area.

The method of the present invention would have several advantages over the method used commercially at present. The acid volume used could be signicantly smaller than when using the conventional dilute $H_2SO_4$ system or the concentrated organic acid method. With a rapid direct extraction, most of the extraction unit facilities could be eliminated, e.g., extraction vessels and phase separators. With modest mixing requirements, it may be possible to substitute static mixers for mechanical mixers in existing facilities. Cheaper metals, e.g., 316 or 304 stainless steel could be used for the extraction vessels and phase separators in the downsized and simplified facility and would represent a substantial capital savings. However, the greatest advantage is that the method is accomplished in a single phase, thus eliminating all of the 2 phase procedures, e.g., settling and separating.

In selecting a suitable agent to remove metallic residues from the hydrogenated polymers, a complex and interrelated set of criteria should be considered as desirable: The agent chosen should be substantially inert toward the polymer and polymer solvent; it should be capable of forming a compound which is insoluble in the organic solvent. It preferably reacts with iron (often present as a contaminant from equipment or water); capable of forming an in-soluble compound with nickel or cobalt and aluminum (present as hydrogenation catalyst residues over a wide pH range); preferably when lithium initiated polymers are concerned, it should be capable of reacting with any lithium residues which may remain after forming the original polymers. Agents which fail to satisfy any one of the above criteria may be regarded as unsatisfactory for the present purpose.

OBJECTS OF THE INVENTION

It is an object of this invention to provide an improved method of separating metal catalyst contaminant from organic polymers. It is also an object of this invention to provide an improved method for removing metal catalyst contaminants from organic polymers by a method in which the polymer is treated with an oxidant and dicarboxylic acids.

STATEMENT OF THE INVENTION

Now, in accordance with this invention, a method is provided for treating water insoluble polymer solutions contaminated with one or more metals, for example, iron, nickel, cobalt, lithium and aluminum, said method comprising treating said product with a mixture of an oxidant and one or more dicarboxylic acids forming insoluble metal compounds, and separating the insoluble metal compounds from the polymer solution thereby removing the contaminating metal residues.

More particularly, there is provided a method of treating a nickel-contaminated water-insoluble product made by hydrogenating an unsaturated polymer of the group consisting of conjugated diene homopolymers and copolymers of conjugated dienes and vinyl arenes containing a catalyst prepared from a salt or chelate of nickel reduced with an aluminum compound, said method comprising contacting a solution of said product in an organic solvent with an oxidant and dicarboxylic acid thus forming an insoluble metal compound separating the insoluble compound from the polymer, thereby removing the nickel contaminant from the product.

The method of this invention may also be applied to organic polymers that are not necessarily products from hydrogenation, but which contain metal contaminants. Such a polymer may be contaminated incidentally with metal, such as iron or nickel, produced by reducing a metal compound, as with an aluminum alkyl compound.

The various components of the hydrogenation product and the agents used in the metal removal treatment will now be described:

Among the unsaturated polymers that may be hydrogenated to products suitable for treatment by the method of this invention are homopolymers made from open chain conjugated dienes having from 4 to 8 carbon atoms per molecule, preferably 4 to 6 carbon atoms per molecule, various types (e.g., blocks or random) of copolymers of these conjugated dienes with vinyl arenes, and homopolymers of vinyl arenes.

The homopolymers, random copolymers and block copolymers can be made by processes will known to the art. Free radical polymerization of unsaturated hydrocarbon monomers is discussed at length in Whitby's book "Synthetic Rubber" and in hundreds of patents and scientific papers. Block copolymers are the subject of many patents and numerous scientific papers. References that describe polymerization techniques for block polymers are U.S. Pat. Nos. 3,231,635; 3,301,840; 3,465,063; and 3,281,383. The term "vinyl arene" as used herein is intended to include styrene, ring substituted styrenes and species having alkyl substituents on the vinyl group in the alpha position such as alpha methyl styrene.

These unsaturated polymers may be hydrogenated partially, or selectively, or completely by techniques known to the art, using finely divided metals as catalyst and hydrogen under pressure and elevated temperature. The catalyst may be for example, nickel or kieselguhr, Raney nickel, finely divided cobalt, and the like. It will be understood that it is not important to this invention how the metal catalyst was made. With these catalysts hydrogenation may be partial or complex, in the sense that all or part of the double bonds in the unsaturated polymers are saturated.

A particularly useful type of metal catalyst is made by reducing a metal compound or chelate of cobalt or nickel, with an aluminum containing reducing agent. An example is a reaction product of nickel acetate with triethyl aluminum. Nickel and cobalt salts of alkanoic acids with from 1 to 12 carbon atoms in the alkanoate moiety are particularly suitable, as are nickel chelates, such as nickel acetylacetonate. Dicobalt octacarbonyl, cobalt acetate, cobalt hydroxide and cobalt salts of alkanoic acids all product essentially the same results. Organometallic reducing agents may be aluminum compound, especially hydrocarbyls such as aluminum triethyl, aluminum triisobutyl, aluminum triphenyl and the like. Lithium aluminum hydride, aluminum hydride and aluminum powder may also be used as reducing agents.

These catalysts permit selective hydrogenation of copolymers as disclosed in detail in U.S. Pat. No. 3,595,942.

Suitable precursor polymers include linear and branched configurations having individual polymer blocks such as polybutadiene, polyisoprene, polystyrene or polyalpha-methylstyrene. Typical species include polystyrene-polyisoprene, polystyrene-polybutadiene-polystyrene and poly(alpha-methylstyrene)-polyisoprene-poly(alphamethylstyrene).

Typical completely hydrogenated polymers containing metal catalysts that benefit from the method of this invention are hydrogenated polybutadiene, hydrogenated polyisoprene, completely hydrogenated polystyrene, completely hydrogenated random styrene-butadiene copolymers, completely hydrogenated vinyl arene-diene block copolymers, described in U.S. Pat. Nos. 3,333,024 and 3,431,323, and completely hydrogenated all-diene block copolymers, described in U.S. Pat. No. 3,465,063. Suitable hydrogenation conditions and catalysts are described in Canadian Pat. No. 815,575.

Hydrogenation may be conducted under the usual conditions known to the art, as represented especially by U.S. Pat. No. 3,595,942 and British Pat. No. 1,020,720.

When hydrogenation is finished, the metal catalyst residue is insoluble in the water-immiscible inert solvent, usually a hydrocarbon, used for the hydrogenation. The hydrogenated polymer may be in solution, or it may be partially precipitated if the polymer structure is such that it partially crystallizes; for example, a hydrogenated polystyrene-polyisoprene-polystyrene is soluble in a cyclohexane hydrogenation solvent, but the hydrogenated cis 1,4 polybutadiene is a crystalline polyethylene that may be only partly soluble at room temperature. Aliphatic, cycloaliphatic and aromatic solvents may be used. Cyclohexane is a preferred solvent.

Any dicarboxylic acid soluble in the cement will work in this process, however, preferred dicarboxylic acids are adipic acid and azelaic acid (nonanedioic acid). It is believed that effectiveness of this precipitation technique is due to the formation of an inorganic polymer with the dicarboxylic acids according to the following equation:

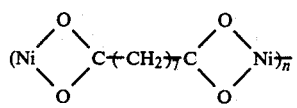

The amount of acid necessary is an amount in excess of the stoichiometric amount needed to react with all of the metals present in the polymer. The acid may be added as a solid or a solution in a hydrocarbon solvent, e.g., toluene or ethanol or the solvent present in the polymer cement.

The exact chemical mode of action of the oxidant is not understood. The presence of an oxidant is not critical but it may be such typical species as oxygen, hydrogen peroxide or aryl or alkyl hydroperoxides. Amounts of oxygen required may range from 0.1 to 100 moles of oxygen per mole of metal, but a molar ratio between 0.1 and 5 is preferred. Hydrogen peroxide requirements may range from 0.1 to 100 moles per mole of metal in the hydrogenation product, with 0.1 to 5 the preferred range of the molar ratio. The quantities of alkyl hydroperoxides needed range from 0.1 to 100 moles per mole of metal, but preferably a molar ratio of 0.1 to 5 should be used.

Hydrogen peroxide may be added as a small amount of 30% hydrogen peroxide. Organic peroxides such as alkyl or aryl hydroperoxides suitable for this invention may be primary, secondary or tertiary alkyl hydroperoxides, although the tertiary alkyl hydroperoxides are preferred. Examples are ethyl peroxide, butyl hydroperoxides, isopropyl hydroperoxide, tertiary butyl hydroperoxide and the like. Tertiary butyl hydroperoxide is a preferred oxidant.

The product may be contacted with oxidant before, or simultaneously with, treatment with the acid. If oxidant is applied before the acid, it may be bubbled through the hydrocarbon polymer product, as with air or oxygen, or it may be added as a liquid or solution, as with hydrogen peroxide or tertiary alkyl hydroperoxide, with thorough agitation.

Alcohol may be present as an optional component in an amount of 1–20 wt. percent of the polymer, they may be aliphatic monohydric alcohols containing preferably not more than 4 carbon atoms.

Methanol, isopropanol and ethanol are preferred alcohols.

The method of this invention may be conducted at temperatures from about 5° C. to 200° C. and at pressures from 0.1 atm. to 20 atm. Preferred temperatures are from 10° to 200° C. and preferred pressures are from 0.5 atm. to 5 atm. Contact times will range from 0.01 hour to 10 hours in the treating steps and from 0.01 to 14 hours in the phase separation step, but preferred contact times are 0.02 hour to 1 hour in the treating step and 0.02 to 1 hour in the phase separation step.

Treatment of the product involves intimate mixing of the polymer and the acid and the oxidant by any of the techniques known to the chemical engineer.

Separation to remove the metal precipitate may be done by any of several means known to the art. The may be placed in a settling tank, or it may be centrifuged or it may be run through filters, or by other means.

The following examples illustrate the manner in which the invention may be carried out. The examples are for purposes of illustration, and the invention is not to be regarded as limited to any of the specific compounds or polymers or to the conditions recited.

EXAMPLES

Both adipic acid and azelaic acid (nonanedioic acid) were studied as catalyst removal agents. 15% by weight of an unhydrogenated EP-S diblock copolymer precursor with approximate block molecular weights of 65,000 and 37,000 containing 200 ppm Ni and 200 ppm Al was used as the solution to be extracted. This system was chosen so that the viscosity of the polymer solution in the settling experiment at room temperature would approximate the viscosity of typical hydrogenated cement at 70° C. In a typical experiment, 100 ml of polymer cement was heated at 70° C. To this solution was added a 50% excess based on the metals in solution of dicarboxylic acid. The dicarboxylic acid was pre-dissolved. Azelaic acid was added as a 10 ml solution in toluene. Adipic acid was added as a 5 ml solution in ethanol. The stirred solution discolored in about 30 seconds accompanied by the appearance of a green precipitate which was gravity settled overnight. By the next morning, settling was essentially complete leaving a clear, colorless supernatant cement phase. Ni analyses were performed on the cement phase by atomic absorption. With azelaic acid, Ni and Al levels in the cement after settling were 1 and 2 ppm, respectively, which corresponds to 99.5% removal of Ni. With adipic acid, Ni and Al levels in the cement after settling were 2 and 5 ppm, respectively, which corresponds to 99% removal of Ni. Both experiments were quite successful by current requirements which typically require less than 10 ppm residual Ni in the polymer cement. The flocculant green Ni dicarboxylate salts settled quite well even from a relatively viscous solution leaving a limpid, water-white supernatant cement.

What is claimed is:

1. A method is provided for treating water insoluble hydrogenated polymer solutions contaminated with one or more metals, selected from the group consisting of iron, nickel, cobalt, lithium and aluminum, said method comprising treating said solution with one or more dicarboxylic acids and an oxidant selected from the group consisting of oxygen, hydrogen peroxide and aryl and alkyl hydroperoxides, thereby forming insoluble metal containing polymers and separating said metal-containing polymers from the polymer solution thereby removing the contaminating metal residues.

2. The method of treating a nickel-contaminated water-insoluble hydrogenated product made by hydrogenating an unsaturated polymer of the group consisting of conjugated diene homopolymers and copolymers of conjugated dienes and vinyl arenes containing a catalyst prepared from a salt or chelate of nickel reduced with an aluminum compound, said method comprising the steps of (a) contacting a solution of said product in a water-immiscible solvent with a dicarboxylic acid, said acid being present in molar excess relative to the nickel to be removed, and optionally an oxidant selected from the group consisting of oxygen, hydrogen peroxide and aryl and alkyl hydroperoxides thus producing insoluble metal-containing polymers, then (b) separating the metal-containing polymers from the product, thereby removing the nickel contaminant from the product.

3. A method according to claim 1 wherein the unsaturated polymer, prior to hydrogenation, is a copolymer of styrene and butadiene.

4. The method according to claim 1 wherein the unsaturated polymer, prior to hydrogenation, is a conjugated diene homopolymer.

5. The method according to claim 1 wherein the unsaturated polymer, prior to hydrogenation, is a block copolymer of a conjugated diene and a vinyl arene.

6. The method according to claim 4 wherein the unsaturated block copolymer, prior to hydrogenation, is polystyrene-polybutadiene-polystyrene.

7. The method according to claim 4 wherein the unsaturated block copolymer, prior to hydrogenation, is poly alpha methyl styrene-polybutadiene-poly alpha methyl styrene.

8. The method according to claim 1 wherein the metal-containing polymer is separated by filtration.

9. The method according to claim 1 wherein the metal-containing polymer is separated by centrifugation.

10. The method according to claim 1 wherein the oxidant is present at between 0.1 and 100 moles of oxygen per mole of metal.

11. The method according to claim 1 wherein the oxidant is present at between 0.1 and 5 moles of oxygen per mole of metal.

12. The method of claim 1 wherein the $H_2O_2$ is approximately a 30% solution in water.

13. The method of claim 1 wherein the dicarboxylic acid is present at between 1 and 10 moles per mole of metal to be removed.

14. The method of claim 1 wherein the dicarboxylic acid is added as a solution in a solvent.

15. The method of claim 14 wherein the solvent is toluene.

16. The method of claim 14 wherein the solvent is ethanol.

* * * * *